United States Patent Office 2,962,506
Patented Nov. 29, 1960

2,962,506

STABILIZATION OF 2-p-DIOXANONE

James P. Brusie, Bangor, Pa., assignor to General Aniline & Film Corporation, New York, N.Y., a corporation of Delaware No Drawing. Filed Oct. 22, 1959, Ser. No. 847,895

6 Claims. (Cl. 260—340.6)

This invention relates to the stabilization of 2-p-dioxanone.

It is well known that 2-p-dioxanone, in common with various other lactones having more than five members in the ring, has a strong tendency to polymerize. In the case of 2-p-dioxanone this tendency is so strong that both crude and purified specimens become polymerized merely upon standing at room temperature within a relatively short time, sometimes in a matter of a few days. It is believed that the polymerization takes place with the formation of a longer open chain polyester. This results in an elevation of the melting point causing the material to exist as a solid at and above room temperature, resulting in difficulty in handling, inconvenience in removing the material from its containers, and it interferes materially with the use of the compound as a monomer for certain applications and especially with the use of 2-p-dioxanone as a monomeric intermediate in certain of its many chemical reactions, and it even interferes with the polymerization of it under certain selected conditions for the purpose of obtaining selected resultant properties. It is imagined that this strong tendency to polymerize and the utter inability of technologists to do anything to prevent it in the years past has prevented 2-p-dioxanone from ever becoming commercially available; for, except for this, the compound would be expected to be a major item in the chemical industry. The stabilization of 2-p-dioxanone in the monomeric state constitutes the principal object of the present invention.

Other objects and advantages will be more clearly evident from the following discussion.

I have found that the foregoing objects are readily accomplished by the addition of a small amount of a liquid alcohol to 2-p-dioxanone in the monomeric state. The presence of the small amount of liquid alcohol impedes the polymerization of the said 2-p-dioxanone. In other words, the addition of small amounts of liquid alcohol substantially retards the polymerization of dioxanone. The amount of liquid alcohol to be employed may range from 0.5 to 25% or more by weight of the 2-p-dioxanone.

As examples of liquid alcohols that may be employed to retard the polymerization of 2-p-dioxanone the following may be mentioned: methanol, propanol, isopropanol, tert-butanol, ethylene glycol, etc. In practicing the present invention one adds the alcohol to the monomeric 2-p-dioxanone with stirring. This results in a clear solution. The amount of liquid alcohol to be added is dependent upon the period for which inhibition is required, the tendency of the 2-p-dioxanone to polymerize, and the degree of polymerization required. This may range from 0.5 to 25% or more by weight of the 2-p-dioxanone. The liquid alcohol may also be added to partly polymerize 2-p-dioxanone in the same concentration to prevent further polymerization, and the polymerized 2-p-dioxanone may be depolymerized at least to some extent by the addition of the alcohol. In order to illustrate the process by which the polymerization of 2-p-dioxanone is substantially retarded, the following examples are resorted to. All parts given are percent by weight.

*Example I*

A series of 10 mixtures containing from 0.69% to 23.4% methanol with 2-p-dioxanone were prepared, placed in stoppered bottles and allowed to stand at 60° C. together with blanks. This temperature was selected because it was believed that the rate of polymerization was accelerated at this temperature as compared to room temperature, and thus the experiments would be of a more practical duration.

At ten days the blanks began to separate solid polymer at 60° C. This illustrates the tendency of the sample of 2-p-dioxanone to polymerize.

None of the mixtures containing methanol became cloudy at ten days. This illustrates the ability of methanol to prevent polymerization.

At 26 days the mixture containing 0.69% methanol started to become cloudy at 60° C. This illustrates the stability of the 2-p-dioxanone containing 0.69% methanol.

At 46 days the mixtures containing 1.4% and 2.7% methanol became cloudy. This further illustrates the increased stability of 2-p-dioxanone containing methanol.

The system containing 5.3% remained clear for 66 days, 7.7% endured for 119 days and 10.0% for 216 days. A mixture containing 22% methanol has remained clear for over 9 months at 60° C. Some of these will probably endure indefinitely.

For many uses the presence of the liquid alcohol may be ignored since it is usually present in small amounts and will not interfere with many reactions and applications. Should the liquid alcohol be objectionable, it can however be very readily removed by evaporation or by distillation.

*Example II*

This example is provided to illustrate that the problem of stabilizing 2-p-dioxanone was not easily solved and that considerable specificity was required of the stabilizer. A large number of a wide variety of materials were compounded with 2-p-dioxanone and maintained at 60° C. as in Example I. Blanks were always included, and the average time to solidification was about 11 days. This is a greater degree of polymerization than in Example I. None was found which extended the period for more than about 1 day, although the compounds tried included all sorts of amines, acids, inorganic bases, organic and inorganic salts, dehydrating agents, anhydrides, phenols, quinones, radical inhibitors, and other miscellaneous compounds.

The manner in which the methanol operates in this system is not understood. It is especially mysterious since it operates at such low concentrations. It is further complicated by lack of a complete understanding of the manner in which the 2-p-dioxanone starts to polymerize in the first place. In other words, it is not known whether the methanol forms complexes with traces of impurities which would otherwise initiate polymerization. Furthermore, it is not known whether the methanol terminates the chain through a coordination or other mechanism. The fact remains, however, that methanol and to a lesser extent the other aforementioned liquid alcohols have the unique tendency of substantially retarding the polymerization of 2-p-dioxanone.

*Example III*

Example I was repeated using 5% by weight of tert.-butanol. Thirty-seven days elapsed before the first evidence of polymerization appeared.

Example IV

Example III was again repeated with the exception that isopropanol was employed with substantially the same results after 30 days.

Example V

Example III was again repeated with the exception that ethylene glycol was used with substantially the same results after 27 days.

Example VI

A sample of polymerized 2-p-dioxanone (melting point about 90–100°) had an arbitrary amount of methanol added to it. Upon shaking, decanting and evaporating, a residue was obtained which was a liquid at room temperature. This illustrates a depolymerizing effect of added methanol. The amount of alcohol employed may range from 15 to 60% by weight of the polymer.

Example VII

A sample of polydioxanone was agitated with methanol as in Example VI. Upon analysis the methanol was found to have dissolved 20.7% dioxanone. The experiment was not continued beyond this point. This example further illustrates the ability of the methanol to depolymerize the polymerized 2-p-dioxanone.

I claim:

1. The process of impeding the polymerization of 2-p-dioxanone which comprises adding thereto a liquid aliphatic alcohol selected from the group consisting of monohydric and dihydric alcohols of 1 to 4 carbon atoms in an amount ranging from about 0.5% to 25% by weight thereof.

2. The process according to claim 1 wherein the liquid alcohol is methanol.

3. The process according to claim 1 wherein the liquid alcohol is isopropanol.

4. The process according to claim 1 wherein the liquid alcohol is tert.-butanol.

5. The process according to claim 1 wherein the liquid alcohol is ethylene glycol.

6. The process of depolymerizing partially and completely polymerized 2-p-dioxanone by adding thereto a liquid aliphatic alcohol selected from the group consisting of monohydric and dihydric alcohols of 1 to 4 carbon atoms in an amount ranging from 15 to 60% by weight thereof.

No references cited.